Feb. 13, 1962 W. E. MORGAN, JR 3,021,424
AUTOMATIC FREQUENCY CONTROL SYSTEM
Filed Aug. 30, 1952 2 Sheets-Sheet 1
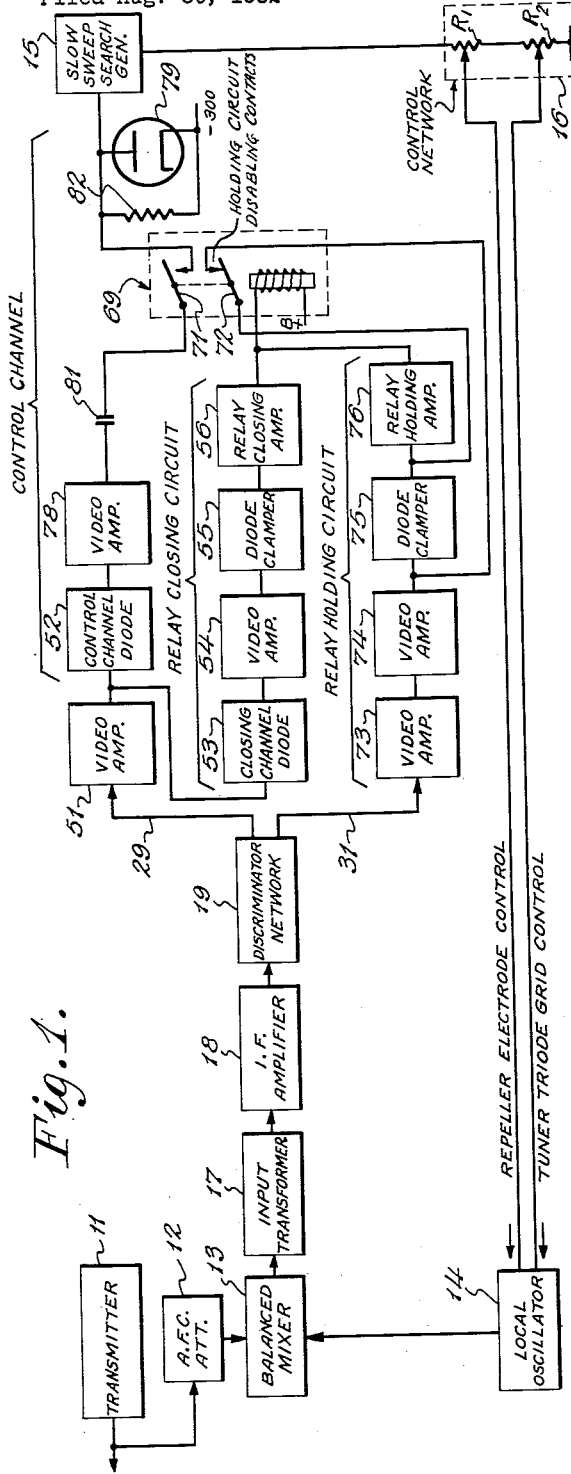
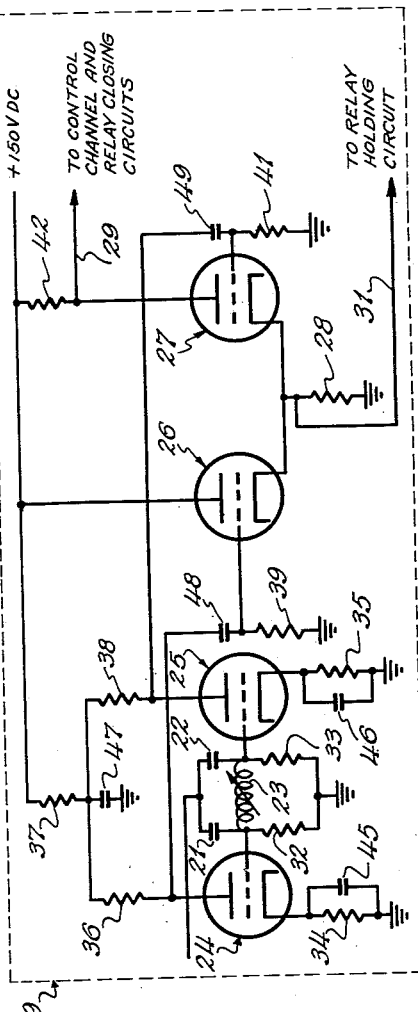
INVENTOR
WILLIAM E. MORGAN, JR.
BY
Thomas M. Ferrill, Jr.
ATTORNEY Feb. 13, 1962 — W. E. MORGAN, JR — 3,021,424
AUTOMATIC FREQUENCY CONTROL SYSTEM
Filed Aug. 30, 1952 — 2 Sheets-Sheet 2

INVENTOR
WILLIAM E. MORGAN, JR.
BY
ATTORNEY

United States Patent Office 3,021,424
Patented Feb. 13, 1962

3,021,424
AUTOMATIC FREQUENCY CONTROL SYSTEM
William E. Morgan, Jr., Levittown, N.Y., assignor to Sperry Rand Corporation, a corporation of Delaware
Filed Aug. 30, 1952, Ser. No. 307,197
11 Claims. (Cl. 250—20)

This invention relates to automatic frequency control systems. It is particularly concerned with apparatus for automatically maintaining the frequency of a high frequency continuous-wave local oscillator at a predetermined and constant frequency difference from the carrier frequency of a series of radar pulses.

One prior type of automatic frequency control system comprises a discriminator, a search stopper, and a slow-sweep search generator for controlling the frequency of a local oscillator. Such a system is described in Sec. 7–10 of the book entitled "Microwave Mixers," volume 16 of the M.I.T. Radiation Laboratory Series, published by McGraw-Hill in 1948. In the aforementioned system a discriminator produces an error signal voltage output of varying intensity and polarity in response to input energy containing frequency components within intermediate frequency sidebands on both sides of the carrier frequency of a radar transmitter. The response during passage through one sideband is the mirror image of the response during passage on through the other sideband, as is seen in FIGS. 7–17 of the aforementioned textbook. When a signal having a predetermined polarity appears in the discriminator output circuit, it controls the search stopper to arrest the voltage sweep of the search generator. The frequency search of the local oscillator is also arrested since the local oscillator frequency is controlled by a voltage derived from the search generator. Therefore, the local oscillator is held at a frequency which, when heterodyned with the carrier frequency of the radar transmitter, results in maintenance of an intermediate frequency during one or the other discriminator sideband responses.

Locking during both discriminator sideband frequency responses is undesirable where locking on one sideband occurs at a different value of the intermediate frequency from that resulting when the system locks on the opposite sideband, a disadvantage of the above-described circuit. Furthermore, the aforedescribed system is unsatisfactory for use in some monopulse radar systems wherein locking during the wrong wide band frequency response would cause the system to generate signals of the wrong polarity for correct tracking.

It is an object of this invention to provide a system for locking a local oscillator, which is controlled in frequency by a slow sweep search generator, to a frequency which is at a predetermined and constant difference from the carrier frequency of a series of radar pulses transmitted in a radar system.

It is a further object of this invention to provide that the local oscillator becomes positively locked at only one of the two usually possible lock-on frequencies, and that a predetermined difference between the frequency of the local oscillator and the carrier frequency of the radar pulses is positively maintained regardless of changes in temperature, supply voltage, or other factors that influence the operating frequency of the radar transmitter or local oscillator.

Still another object of this invention is to insure, if for some reason the system is unlocked or searches beyond the desired frequency response range toward the undesired frequency response range, that the system will automatically reject the undesired response and continue to search to a point in the search cycle at which the proper lock-on will be effected.

The foregoing objects are met by providing an automatic frequency control system which includes a discriminator network, a control channel, a relay, and two relay control circuits. The control channel includes a selective coupling means, which is regulated by the relay, and a search stopper control circuit. A slow sweep search generator is employed to continuously change or scan the frequency of a high frequency local oscillator over a wide frequency range, said range including the carrier frequency of a series of transmitted radar pulses. Upon the completion of the control channel circuit by the selective coupling means, i.e., coupling between the search generator and discriminator network via the search stopper control circuit, and operation of the search stopper control circuit by a voltage of a predetermined polarity derived from the discriminator network, the sweep of the search generator is arrested to maintain the local oscillator frequency at a point where the difference between the frequency of the local oscillator and the carrier frequency of the radar pulses is at a desired value. The relay and control circuits therefor are employed to insure that the selective coupling means completes the aforementioned control channel circuit only during a discriminator sideband frequency response and only when the voltage output from the discriminator network is initially at a polarity opposite the aforesaid predetermined polarity, and thereafter for a substantially uninterrupted discriminator response regardless of polarity.

Other features and advantages of the invention will become apparent to those skilled in the art from the detailed description thereof taken in connection with the accompanying drawings in which:

FIG. 1 is a block diagram of a portion of a pulse radar system embodying the present invention;

FIG. 2 is a schematic diagram of a discriminator network utilized in the invention;

Figure 3:
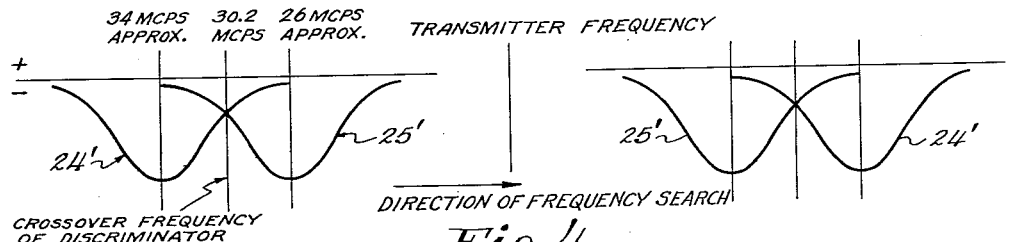
FIGS. 3–5 illustrate graphically the amplitude envelope and polarity of pulses obtained at various points in the discriminator network as a function of the difference frequency pulses entering said network.

Referring to FIG. 1, a transmitter 11 produces recurrent pulses of microwave energy, the pulses having a duration of 0.15 microsecond and a repetition rate of 4000 pulses per second. A version of the output of transmitter 11 is passed through a variable attenuator 12 and applied to a balanced crystal mixer 13. Continuous-wave energy from a local oscillator 14 is also applied to the aforementioned mixer 13, which preferably comprises a wave guide hybrid T having a detector therein.

Local oscillator 14 comprises a thermally tuned 2K50 reflex klystron of the type shown on page 293 of the aforementioned book entitled "Microwave Mixers," and is controlled in output frequency by negative voltage derived from the plate of a slow sweep search generator 15. Search generator 15 may be an oscillator of the type shown and described in Sec. 7–13 of the aforementioned textbook, starting on page 326, and is sometimes referred to as a transitron. In the present arrangement, generator 15 is designed to produce a sawtooth voltage waveform in its plate circuit which is substantially identical with that shown in the uppermost diagram in FIG. 7.24 of the above-mentioned textbook, except that the useful search voltage is made negative with respect to ground. The aforementioned search or control voltage must be negative to regulate the tuning of the klystron local oscillator 14. Application of the negative search voltage is done through a control network 16 comprising resistors $R_1$, $R_2$, $R_3$ and $R_4$, with a negative voltage being applied to the repeller electrode and negative bias voltage applied to the grid of the tuner triode in the 2K50 reflex klystron 14 from the generator 15. The +150 v. supply shown connected to network 16 of FIG. 1 in conjunction with resistors $R_3$ and $R_4$ regulates the level of the negative grid bias for the aforementioned tuner triode.

The gradual sawtooth sweep of the plate voltage of search generator 15 causes the frequency of local oscillator 14 to vary from approximately 23,500 to 24,500 megacycles per second, for example. At the end of the sweep cycle of the search generator 15, the plate voltage thereof is abruptly returned to its original value to start the tuning cycle over again. In one successful system embodying the present invention, about 45 seconds is required for the sweep generator to proceed through one sweep cycle.

The signals derived from the output of mixer 13 are in the form of wave-trains or pulses containing energy components at the difference frequency between the carrier frequency of the radar pulses from transmitter 11 and the high frequency energy from local oscillator 14. These pulses of intermediate frequency energy are fed into a balanced-to-unbalanced transformer 17 which may be of the type shown in FIGS. 6–13 and described on pages 271–274 of the aforementioned book entitled "Microwave Mixers." The output of transformer 17 is connected to the input grid of a broad-band self-biased intermediate frequency amplifier 18.

The amplified pulses of intermediate frequency energy from amplifier 18 are applied to a discriminator network 19, shown in more detail in FIG. 2. This discriminator network 19 comprises a tuned circuit arrangement consisting of capacitors 21 and 22 and an adjustable inductor 23, a pair of self-biased plate detector vacuum tubes 24 and 25, and a further pair of vacuum tubes 26 and 27. The cathodes of tubes 26 and 27 are connected together, and are connected to ground through a common cathode resistor 28. Capacitors 21 and 22 are of unequal values, in order that the signals fed into the respective grid circuits of plate detectors 24 and 25 will vary in amplitude according to predeterminedly different functions of frequency of the output signals from amplifier 18. The relative amplitude envelope of pulses obtained at the plates of tubes 24 and 25 is shown in FIG. 3 by curves 24' and 25', respectively.

Figure 5:
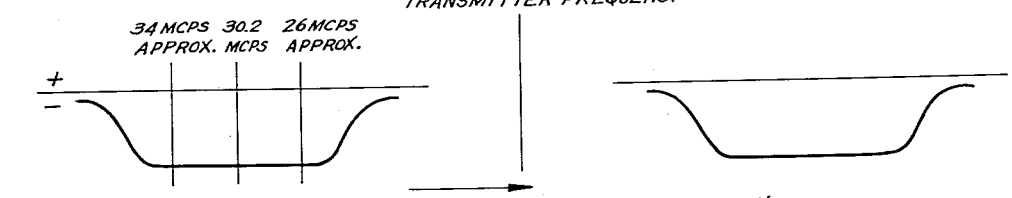

Referring again to FIG. 2, the output voltage pulses from the plates of tubes 24 and 25 are fed to the grids of tubes 26 and 27 respectively. Resulting pulses derived across resistor 28 are negative in polarity with respect to the quiescent voltage thereacross, and substantially constant in intensity throughout the frequency range of 34 to 26 megacycles per second, as illustrated in FIG. 5. When pulses are received from the intermediate frequency amplifier 18 having a carrier frequency within a predetermined frequency range above 34 megacycles per second, tube 24 is actuated because of the action of filter network 21, 22 and 23. Output pulses from tube 24 are applied to the grid of tube 26, and not tube 27. This reduces the current in tube 26 during each pulse, and also the voltage drop across the resistor 28. The relative intensity of the pulses obtainable across resistor 28 during the aforesaid predetermined range of frequencies is illustrated in FIG. 5 by the portion of the curve to the left of the abscissa designated 34 megacycles per second.

When amplified intermediate frequency pulses of between 34 and 26 megacycles per second are supplied to the discriminator network 19, the total current flow in tubes 26 and 27 is reduced during the pulses. At frequencies between 34 and 30.2 megacycles per second the current reduction in tube 26 is greater than the current increase in tube 27. At frequencies between 30.2 and 26 megacycles per second the reverse is true. Throughout the frequency range of 34 to 26 megacycles per second, the total drop in current flow through these two tubes 26 and 27 during each pulse is substantially constant, resulting in unidirectional pulses of substantially uniform intensity across resistor 28 throughout this band of frequencies, as illustrated in FIG. 5.

When the intermediate frequency carrier component of the pulses received from the intermediate frequency amplifier 18 is within a predetermined range below approximately 26 megacycles per second, tube 25 is actuated. Output pulses therefrom are applied to the grid of tube 27 and not tube 26. Since such pulses decrease in negative intensity over the aforesaid predetermined frequency range in a manner illustrated by the curve 25' to the right of the point designated 26 megacycles per second in FIG. 3, the current flow through tube 27 and voltage across resistor 28 during pulses increases from its lowest value back to its original quiescent operating value.

Figure 4:
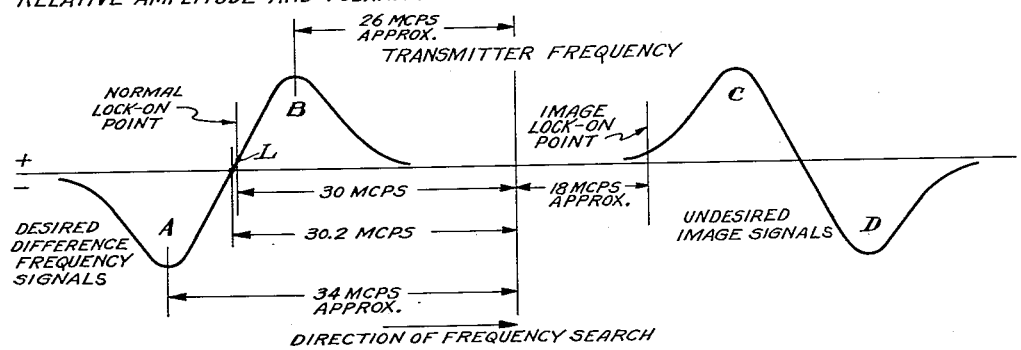

Referring to FIGS. 2 and 4, when tube 24 alone is producing negative pulses at frequencies of 34 megacycles per second and higher, they are applied only to tube 26. This causes pulse reductions of the common cathode voltage of both tubes 26 and 27 from the quiescent value, since the cathodes are connected together. Therefore, there is increased flow of current in the plate circuit of tube 27 during the pulses, resulting in negative output pulses on conductor 29, of amplitude indicated by the portion of the curve to the left of the point designated 34 megacycles per second in region A of FIG. 4. If tube 25 alone is producing negative pulses, tube 27 inverts them and supplies over conductor 29 positive pulses of amplitude indicated by the portion of the curve of FIG. 4 to the right of the point designated 26 megacycles per second, in region B. When pulses from tubes 24 and 25 are approximately equal and are applied simultaneously to tubes 26 and 27 respectively, as they are when the intermediate frequency from amplifier 18 is 30.2 megacycles per second, there is no pulse output from tube 27 on conductor 29. When unequal pulses are applied simultaneously to tubes 26 and 27, as is the case at frequencies between 34 and 26 megacycles per second (excluding the crossover frequency of 30.2 megacycles per second), the pulse output from tube 27 over conductor 29 is negative on one side of the crossover frequency and positive on the other. The polarity depends on which of detectors 24 and 25 is producing pulses of the greater intensity.

Some typical representative values for the various circuit elements in FIG. 2, whereby pulses are produced having the required relative polarity and amplitude at the discriminator outputs 29 and 31 as shown in FIGS. 4 and 5, are as follows:

Resistors
["K" denotes 1,000 ohms]

| Ref. No.: | Value |
| --- | --- |
| 28 | 1.0K |
| 32 | 3.3K |
| 33 | 3.3K |
| 34 | 100K |
| 35 | 100K |
| 36 | 33K |
| 37 | ohms 220 |
| 38 | 33K |
| 39 | 220K |
| 41 | 220K |
| 42 | 22K |

Capacitors
[All values in micro-microfarads unless otherwise indicated]

| Ref. No.: | Value |
| --- | --- |
| 21 | 20 |
| 22 | 5 |
| 45 | µfd 0.1 |
| 46 | µfd 0.1 |
| 47 | 510 |
| 48 | 6800 |
| 49 | 6800 |

Referring again to FIG. 1, the output pulses provided by discriminator network 19 via output lead 29 are fed into a video amplifier 51, which may be a self-biased triode. The output of video amplifier 51 is fed into a "control channel" beginning with diode 52, and a relay closing circuit beginning with diode 53.

Diode 53 is so connected that only positive pulses from the output of amplifier 51 are passed thereby. Positive pulses passed by diode 53 are inverted and amplified by video amplifier 54, and then fed into a circuit containing diode clamper 55 and relay closing amplifier 56.

Figure 6:
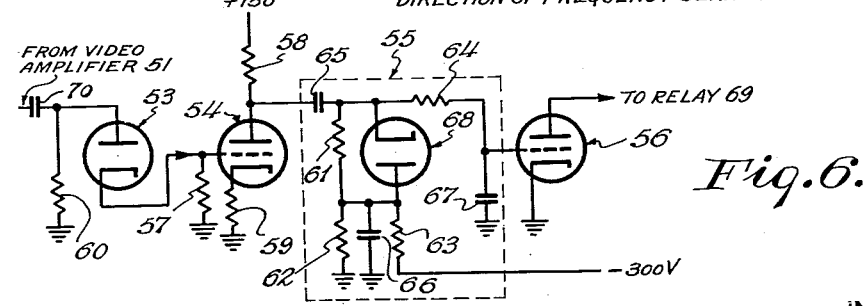
FIG. 6 illustrates in detail a diode clamper circuit which may be used in the system of FIG. 1.

Diode 53, video amplifier 54, diode clamper circuit 55 and relay closing amplifier 56 are shown in detail in FIG. 6. Amplifier 56 is biased well below cut-off. Typical values for the component resistors and capacitances of the circuit shown in FIG. 6 are as follows:

Resistors

["K" denotes 1,000 ohms]

| Ref. No.: | Value |
|---|---|
| 57 | 3.3K |
| 58 | 10K |
| 59 | 1K |
| 60 | 10K |
| 61 | 1 megohm |
| 62 | 33K |
| 63 | 470K |
| 64 | 220K |

Capacitors

| Ref. No.: | Value |
|---|---|
| 65 | 0.01 μfd |
| 66 | 0.1 μfd |
| 67 | 510 μμfd |
| 70 | 5600 μμfd |

The operation of the circuit of FIG. 6 is as follows: Positive video pulses, which pass through diode 53 are fed into video amplifier 54. The resulting negative pulses at the output of amplifier 54 are of sufficient amplitude to initiate operation of diode 68, causing condenser 65 to discharge very rapidly through diode 68. At cessation of each negative pulse, the condenser 65 starts recharging for the time interval between pulses. During this interval, the diode 68 is incapable of conducting, and the recharging rate is limited by the relatively large resistor 61. As recharging is initiated the voltage at the cathode of diode 68 becomes less negative, therefore reducing the negative bias on the grid of tube 56, whereby tube 56 conducts. During any series of negative pulses at the output of tube 54, the average voltage at the cathode of tube 68 is less negative than the quiescent voltage thereat. Therefore, the bias on the grid of tube 56 is above cut-off throughout said series of pulses, and the plate current which consequently flows through tube 56 energizes a relay 69.

Referring again to FIG. 1, the energization of relay 69 causes a normally open armature switch member 71 to close, and a normally closed armature switch member 72 to open.

When switch member 72 is opened by the above operation, negative pulses from discriminator network 19 on lead 31 are capable of operating the relay 69 through a relay holding circuit comprising video amplifiers 73 and 74, diode clamper 75, and relay holding amplifier 76. Amplifiers 74 and 76 and diode clamper 75 are essentially similar to units 54, 56 and 55 respectively in the relay closing circuit. Signals provided in the relay holding circuit keep the relay 69 energized over the frequency band illustrated in FIG. 5, provided armature switch member 72 is initially opened, as described above.

Control channel diode 52 is connected to pass negative pulses only from video amplifier 51. These negative pulses are inverted and amplified in an amplifier 78, which may be a self-biased pentode video amplifier. If armature switch member 71 is closed, the positive pulses from video amplifier 78 cause diode 79 to conduct, charging condenser 81 through the diode 79. After the pulse, the voltage on the plate of diode 79 becomes more negative than the voltage on the cathode, and condenser 81 discharges gradually through a large resistor 82. At the end of each pulse, as the plate voltage of diode 79 becomes more negative, the grid of search generator 15 is carried with it in a negative direction. The increasing negative potential of the grid of search generator 15 causes its anode potential to rise, and prevents generator 15 from continuing to generate oscillations in its output circuit. In the system described, approximately 10 volt amplitude of the recurrent pulses is required to overcome the bias on the grid of generator 15 on search and cause locking. The circuit and theory of operation of such a device is more completely described in Sec. 7.13 of the "Microwave Mixer" book as was mentioned above.

The mode of operation of the automatic frequency control system is best seen by referring to FIGS. 1 and 4.

The direction of frequency search of the local oscillator 14 is from frequencies appreciably lower than the carrier frequency of pulses produced by transmitter 11 to frequencies higher than said carrier frequency. The difference frequency signals shown at the left of the transmitter frequency in FIG. 4 are designated desired signals and the difference frequency signals at the right thereof are designated undesired or "image" signals. The latter must be prevented from having any effect on the search oscillator so that lock-on will only occur in the region of L shown in FIG. 4.

Frequency search of the local oscillator 14, by search generator 15, carries the local oscillator frequency into region A of FIG. 4. In region A, negative video pulses from the discriminator network 19 on lead 29 are fed into video amplifier 51 where they are amplified and inverted. The resulting positive pulses are fed into the relay closing circuit through diode 53. Amplifier 56 becomes conducting, as described above, actuating the relay 69. This closes armature switch member 71, and opens armature switch member 72 to make the diode clamper 75 ready for operation.

After the armature switch member 72 has thus been opened, pulses derived from discriminator network 19 on lead 31 insure that the relay 69 will remain operated as long as there is no appreciable interruption of the recurrent pulse energy on output lead 31 of the discriminator. Therefore, armature switch member 71 will remain closed and switch member 72 open.

As search of the local oscillator continues in the direction of the arrow in FIG. 4, lock-on of the local oscillator takes place at point L in region B at the desired intermediate frequency of 30 megacycles per second. Lock-on occurs when the rising positive pulses appear on lead 29 from discriminator network 19. Such pulses, when they reach the plate of search stopper diode 79 as previously described, cause the frequency of local oscillator 14 to be maintained at point L of FIG. 4.

After lock-on, as changing operating temperatures or other factors shift the absolute operating frequencies of the transmitter 11 or local oscillator 14, the intermediate frequency will tend to vary. A decreasing intermediate frequency, for instance, results in increasing positive pulses from the discriminator network 19 and an increasing negative voltage on the grid of search generator 15. This causes the output voltage from search generator 15 to become less negative, causing the frequency of local oscillator 14 to decrease. A reverse situation obtains if the above variable factors cause the intermediate frequency to be raised. As a result, balance is maintained and the intermediate or difference frequency is substantially constant.

If for some reason the difference frequency should go to the right in FIG. 4 beyond region B, frequency search of the local oscillator will carry the difference frequency pulses to the right toward region C. This occurs because the discriminator 19 is not responsive between regions B and C, and locking of the sweep generator 15 cannot occur. During this frequency transversal, relay 69 is unactuated, because of the absence of any output from discriminator 19.

In region C, relay holding signals will be generated, but they will not be able to operate the relay through the relay holding circuit because diode clamper 75 is short circuited by the normally closed switch 72. In addition, the relay 69 is not operated through the relay closing circuit, because the pulses at the output of discriminator 19 in region C are of the wrong polarity to pass through diode 53 or to operate the diode clamper circuit 55, after inversion by amplifier 51. Hence, relay 69 does not operate at all in region C, and false lock-on cannot there occur.

In region D of FIG. 4, the relay closing and holding circuits are operated in the aforedescribed manner as to region A to close and open switches 71 and 72 respectively. However, the system will not lock because the pulses at the output of the discriminator 19 in region D are of the wrong polarity to pass through diode 52 or to operate the search stopper tube 79, after inversion by amplifier 51. Hence, the search action continues on beyond region D to the high frequency limit thereof.

At the end of the search cycle beyond region D, the voltage at the plate of sweep generator 15 abruptly returns to a value close to ground potential. This occurs in the same manner that the plate potential of the oscillator described on pages 328–330 in Sec. 7.13 of the aforementioned book entitled "Microwave Mixers" returns to $E_b$. The sudden voltage change is simultaneously applied to the repeller electrode of the local oscillator 14 and the grid of the tuner triode therein. The thermally tuned local oscillator 14 does not oscillate for any appreciable interval during the abrupt voltage change because of the inertia of the thermal tuning mechanism therein. Hence, no intermediate frequency signals are produced during such an interval. For that interval where the local oscillator 14 may oscillate, the intermediate frequency signals produced may or may not be within the intermediate frequency pass band to which the discriminator network is responsive. Intermediate frequency signals which may be in such a band, and which would control the search stopper diode 79, cannot affect the search generator 15 because the plate thereof is cut off by the suppressor during search return, as is discussed at the bottom of page 329 and the top of page 330 of the aforementioned book on "Microwave Mixers."

Thus, a positive automatic frequency control system is provided, wherein a predetermined frequency difference between the local oscillator and the transmitted energy is maintained. If for some reason the system becomes unlocked, it is evident that the frequency of the local oscillator is thereupon automatically varied through a sweep cycle until it is restored to the frequency which, when heterodyned with the transmitted frequency, is at the predetermined difference therefrom.

The various circuit component values which have been given in order to aid in the understanding of this invention are illustrative, and are subject to engineering design variation.

As many changes could be made in the above component values and construction, and many apparently widely different embodiments of this invention could be made without departing from the scope thereof, it is intended that all matter contained in the above description or shown in the accompanying drawings shall be interpreted as illustrative and not in a limiting sense.

What is claimed is:

1. A radar receiver frequency control system for maintaining a predetermined difference between the frequencies of local oscillator and carrier wave radio signals, comprising a variable frequency local oscillator having input frequency control means responsive to changes in voltage for changing the frequency of said oscillator, a frequency discriminator having an output circuit and having a response with a null at a predetermined cross over frequency and an output of first polarity at frequencies on one side of said cross over frequency and an output of second and opposite polarity on the other side thereof, means including a mixer coupled between said local oscillator and discriminator for supplying to said discriminator superheterodyne converted versions of carrier wave radio signals supplied to said mixer, sweep voltage generator means coupled to said input frequency control means of said local oscillator for providing a scanning control voltage for recurrently sweeping the frequency of said local oscillator in one direction through a wide frequency sweep range from one frequency limit to another so that said superheterodyne converted versions of carrier wave radio signals supplied to said mixer pass through said first and second discriminator frequency ranges and then abruptly returning the frequency of said local oscillator back to said one frequency limit, a control channel including a unidirectional current device and a generator arresting and regulating means between said discriminator and said sweep voltage generator, said control channel being responsive to an output voltage of said second polarity only from said discriminator for arresting the scanning voltage of said generator means and regulating the local oscillator frequency therethrough, said arresting and regulating means including a switch having a first position conditioning said arresting and regulating means for operation during a discriminator response and a second position for conditioning said arresting and regulating means for inoperation, means for maintaining said switch in its second position in the absence of a discriminator response, first means including a unidirectional current device responsive only to output voltage from said discriminator of said first polarity for initially actuating said switch into its first position, and second means rendered operative in response to operation of said first means for retaining said switch in its first position coextensively with a substantially uninterrupted output of said frequency discriminator thereafter.

2. In a pulse radio receiving system including a superheterodyne receiver having a tunable local oscillator and a mixer and an intermediate frequency amplifier having a wide frequency band, automatic control apparatus for varying the frequency of the local oscillator until the converted carrier component frequency of the mixer output pulses is brought to a predetermined frequency within said frequency band and thereafter maintaiinng said local oscillator so adjusted as to retain said converted carrier component frequency substantially at said predetermined frequency; said automatic control apparatus comprising: means responsive to a unidirectional voltage for varying the frequency of said local oscillator as a predetermined function thereof, means including a sweep voltage generator coupled to said last-named means for providing recurrent wide range frequency traversals of said local oscillator in a selected scanning direction, the frequency traversal range being in excess of twice said predetermined frequency, frequency discriminator means responsive to the converted carrier output signal component from said mixer and having a cross-over frequency substantially coincident with said predetermined frequency for providing unidirectional output pulses of polarity and magnitude corresponding to the sense and degree of departure of said converted carrier component frequency from said crossover frequency, means for selectively coupling the output of said frequency discriminator means to said sweep voltage generator for constraining said sweep voltage generator from said recurrent wide range frequency traversals and for controlling the output voltage thereof to suppress frequency variations of said local oscillator, and first and second control circuits for actuating said means for selectively coupling said frequency discriminator means to said sweep voltage generator means, said first control circuit being connected to said frequency discriminator means to receive therefrom output pulses of a first polarity and decreasing strength immediately followed by output pulses of the second polarity and increasing strength, as the frequency of said local oscillator is varied in said selected scanning direction toward the carrier frequency of the received pulses, and to receive therefrom output pulses of the second polarity followed by output pulses of the first polarity as the local oscillator frequency is varied in said selected scanning direction away from the carrier frequency of the received pulses, said first control circuit comprising means responsive to pulses of only one of said polarities for initiating actuation of said selective coupling means, and said second control circuit comprising means for holding said selective coupling means actuated only after the initial actuation thereof by said first control circuit and while the converted carrier output signal component of the received pulses is in a band including therewithin the crossover frequency of said discriminator.

3. Tuning control apparatus for a radio receiver of the type which includes a tunable input circuit and voltage responsive means for tuning said input circuit, said control apparatus comprising: a frequency discriminator network, said discriminator network having an output voltage versus frequency response characteristic in an output circuit thereof which is of a first polarity in response to energy from the radio receiver received by said discriminator network within a first frequency range adjacent and on one side of a cross over frequency and of a second and opposite polarity in response to energy received from the radio receiver by said discriminator network within a second frequency range adjacent to and on the other side of said cross over frequency, a slow sweep voltage generator for providing a recurrent sweep voltage waveform for application to the voltage responsive means of the radio receiver, a control channel for said voltage generator, said channel being responsive to a discriminator network output voltage response of said second polarity only for stopping the sweep of the voltage waveform at the output of said generator, switch means having a first position for disabling said control channel and a second position for enabling said control channel, first means connected to said discriminator output circuit for maintaining said switch means in its first position in the absence of an output response of said first polarity from said discriminator network and for actuating said switch means to its second position in response only to an output of said first polarity from said discriminator network, and second means rendered operative upon actuation of said switch means to said second position for maintaining said switch means in said second position in response to a receiver output producing a substantially uninterrupted discriminator response.

4. Control apparatus as set forth in claim 3, wherein said discriminator network has a further output circuit for developing an output voltage, said further output circuit and discriminator having an output response curve relative to the frequency of discriminator input signals which is non-zero over a substantial portion of said first and second frequency ranges and including said cross over frequency of said discriminator response characteristic.

5. Control apparatus as set forth in claim 4, wherein the first and second means of said switch control means include a relay for actuating said switch.

6. Control apparatus as defined in claim 3, wherein a relay comprises a common part of said first and second means for actuating said switching means.

7. Control apparatus as defined in claim 6 wherein an armature switch element of said relay normally blocks energization of said relay through said second means, said armature switch element being responsive to energization of said relay by said first means to unblock the energization of said relay through said second means.

8. Control apparatus as defined in claim 7 wherein said control channel includes a first diode in series between said output circuit of said discriminator network and said generator control circuit, said first diode being connected to conduct energy derived from the output voltage of said discriminator network when at said second polarity, said first means connected to said output circuit of said discriminator network comprising a second diode, said second diode being connected in series with said relay between said output circuit of said discriminator network and said relay, said second diode being connected to conduct energy derived from the voltage output at said output circuit of said discriminator network when said voltage output is at said first polarity.

9. An automatic frequency control system for use in a pulse radar network to maintain a predetermined frequency difference between two sources of high frequency energy, comprising a slow sweep search generator for recurrently varying the frequency of one of said sources over a desired frequency range, a discriminator network having a crossover frequency which is substantially adjacent to said predetermined difference frequency, said discriminator network having a first output circuit in which a discriminator characteristic curve of voltage output response versus frequency comprises a first voltage output peak at a frequency on one side of said crossover frequency and a second voltage output peak at a frequency on the other side of said crossover frequency, said first and second output peaks being at opposite polarities with respect to each other, said discriminator network having a second output circuit for developing a further voltage output response over the frequency band of said characteristic curve of said discriminator network, said further voltage output response being of constant polarity over said frequency band, a control channel, said control channel comprising switching means and a search stopper circuit, first control means coupled to the first output circuit of said discriminator network, said first control means being responsive to energy derived from the first output circuit of said discriminator network of said first polarity to initially actuate said switching means to a first position whereby said slow sweep generator is connected to said discriminator network through said control channel comprising said switching means and search stopper circuit, and second control means connected to the second output circuit of said discriminator network for maintaining said switching means at said first position after initial actuation of said switching means by said first control means, said search stopper circuit being responsive to energy in said control channel derived from the first output circuit of said discriminator network of said second polarity to stop the search of said sweep generator when said generator is connected to said discriminator network through said control channel.

10. An automatic frequency control system for maintaining a substantially constant difference frequency between first and second signal voltages, comprising first and second sources of high frequency energy, a sweep generator coupled to said second source for recurrently varying the frequency of said second source over a predetermined frequency range including the frequency of said first source, a mixer coupled to said first and second sources and responsive to the frequency difference therebetween, a discriminator network coupled to said mixer, said discriminator network having first and second output circuits and a crossover frequency corresponding to a predetermined difference frequency between said first and second sources of high frequency energy, said discriminator network comprising means responsive over a range of frequencies including said crossover frequency for producing control voltages of first and second opposite polarities in said first output circuit thereof, said first polarity occurring when the difference frequency between said first and second sources is higher than said crossover frequency, said second polarity occurring when the difference frequency between said first and second sources is lower than said crossover frequency, said discriminator network comprising means for producing in said second output a control voltage of constant polarity over said frequency range of said discriminator, search stopper means being selectively responsive to energy derived from the first output circuit of said discriminator network having said second polarity, a relay having a first pair of contacts connected to said search stopper means, relay closing means coupled to the first output circuit of said discriminator network for energizing said relay when the output control voltage from said first output circuit of said discriminator is of said first polarity, and thereby connecting said search stopper means through said first pair of relay contacts to said sweep generator and the first output circuit of said discriminator network, relay holding means coupled to the second output circuit of said discriminator network to maintain said relay energized throughout the response frequency range of said discriminator network after energization thereof by said relay closing means, said search stopper means comprising means for stopping the sweep of said sweep generator upon energization of said relay and energization of said search stopper means by energy derived from said first output circuit of said discriminator network having said second polarity.

11. An automatic frequency control system for maintaining a predetermined frequency difference between first and second voltages, comprising a tunable local oscillator, a slow sweep search generator coupled to said local oscillator for recurrently varying the tuning thereof over a predetermined range of frequencies including the carrier frequency of a series of radar pulses, a microwave mixer for producing output pulses in response to said radar pulses and the output of said local oscillator, said microwave mixer output pulses containing a carrier frequency component which is substantially equal to the difference between the frequency of said local oscillator energy and the carrier frequency of said radar pulses, a discriminator network coupled to said microwave mixer, said discriminator network comprising frequency selective means responsive to first and second difference frequency bands, said discriminator network further comprising a first detector coupled to said frequency selective means for producing unidirectional output pulses of varying intensity and of a first polarity throughout said first frequency band, said discriminator network also comprising a second detector coupled to said frequency selective means for producing unidirectional output pulses of varying intensity and of said first polarity throughout said second frequency band, said first and second frequency bands including a common crossover frequency which is slightly different from said predetermined difference frequency to be maintained, the peak intensity output pulses of said first and second frequency bands occurring at frequencies, respectively, higher and lower than said crossover frequency, first and second electron tubes having input circuits coupled, respectively, to said first and second detectors, said first and second electron tubes having their cathodes connected together, said second electron tube having a first output circuit for producing unidirectional pulses of said first polarity in response to unidirectional pulses at the outputs of said first and second detectors when output pulses from said first detector are of greater intensity than from said second detector and unidirectional pulses of a second and opposite polarity in response to unidirectional pulses at the output of said detectors when output pulses from said second detector are of greater intensity than from said first detector, output coupling means for deriving a second output voltage at said common cathode connection of said first and second electron tubes, said second output voltage being of appreciable magnitude and constant polarity throughout the output frequency bands of said frequency selective means, a control channel for connecting the first output circuit of said second electron tube to said search generator, said control channel including a first switching means and a diode control circuit, said control channel being responsive to energy derived from pulses of said second polarity at said first output circuit of said second electron tube, a relay, said relay comprising means responsive to energization thereof for controlling said first switching means and thereby connecting said search generator through said control channel to the first output circuit of said second electron tube, a relay closing channel for energizing said relay, said relay closing channel being connected to the first output circuit of said second electron tube, said relay closing channel comprising means responsive to energy derived from pulses of said first polarity at the first output circuit of said second electron tube for initially energizing said relay thereby controlling said first switching means, and a relay holding channel which is normally blocked by a second switching means, said second switching means being responsive to initial energization of said relay to unblock said relay holding channel, said relay holding channel being coupled to the output coupling means at the common cathode connection of said first and second electron tubes and comprising means for maintaining energization of said relay after initial energization of said relay by said relay closing channel.

References Cited in the file of this patent

UNITED STATES PATENTS

| | | |
|---|---|---|
| 2,351,212 | Houghton | June 13, 1944 |
| 2,434,293 | Stearns | Jan. 13, 1948 |
| 2,434,294 | Ginzton | Jan. 13, 1948 |
| 2,478,977 | Nicholson | Aug. 16, 1949 |
| 2,491,029 | Brunn | Dec. 13, 1949 |
| 2,555,175 | Whitford | May 29, 1951 |
| 2,562,304 | Durand et al. | July 31, 1951 |
| 2,705,756 | Strandberg | Apr. 5, 1955 |

FOREIGN PATENTS

| | | |
|---|---|---|
| 641,900 | Great Britain | Aug. 23, 1950 |

OTHER REFERENCES

Stephenson: Combined Search and Automatic Frequency Control, etc., Proc. I.R.E., vol. 38, pages 1314–1317 (November 1950).